Patented May 22, 1951

2,553,647

UNITED STATES PATENT OFFICE 2,553,647

NAPHTHOQUINONE ANTIMALARIALS

Louis F. Fieser, Cambridge, Mass., and Marlin T. Leffler, Lake Bluff, Ill., assignors to Research Corporation, New York, N. Y., a corporation of New York No Drawing. Application March 20, 1946, Serial No. 655,890

9 Claims. (Cl. 260—396)

This invention relates generally to chemotherapeutic substances and more specifically to quinones, including the corresponding hydroquinones and their esters having an antagonistic action upon organisms which cause malarial infections.

We have found that derivatives of 3-hydroxy-1,4-naphthoquinone, as well as their 3-hydroxy esters, the corresponding hydroquinones and the esters thereof, containing in the 2-position certain groups of hydrocarbon radicals and substituted hydrocarbon radicals, have a remarkable antagonistic action against organisms which cause malarial infections.

These new therapeutic agents include the following groups of compounds:

I. Derivatives of 3-hydroxy-1,4-naphthoquinone of the general formula:

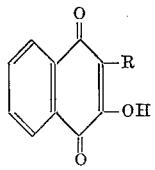

wherein R is a saturated or unsaturated hydrocarbon chain having from 8 to 12 carbon atoms and in which any double bonds present are separated from the quinonoid nucleus by at least three carbon atoms.

II. Derivatives of 3-hydroxy-1,4-naphthoquinone of the general formula:

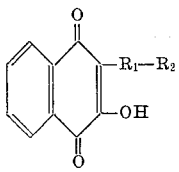

wherein $R_1$ is a hydrocarbon chain and $R_2$ is an alicyclic ring, $R_1$ and $R_2$ together having from 8 to 15 carbon atoms and containing no double bonds in the $\alpha$ or $\beta$ position to the quinonoid nucleus.

III. Derivatives of 3-hydroxy-1,4-naphthoquinone of the general formula:

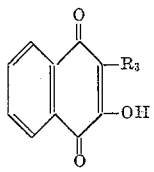

wherein $R_3$ is an alicyclic ring.

IV. Derivative of 3-hydroxy-1,4-naphthoquinone of the general formula:

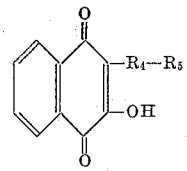

wherein $R_4$ is a hydrocarbon chain and $R_5$ is selected from the group consisting of aryl rings and aryloxy substituted aryl rings, $R_4$ and $R_5$ together having from 10 to 17 carbon atoms.

V. Derivatives of 3-hydroxy-1,4-naphthoquinone of the general formula:

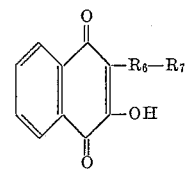

wherein $R_6$ is a hydrocarbon chain and $R_7$ is a halogenated aryl ring, $R_6$ and $R_7$ together having from 7 to 10 carbon atoms.

These groups of compounds have the following chemotherapeutic properties:

They are highly effective agents for the suppression of trophozoites in ducks, chickens, canaries and monkeys infected with either mosquito- or blood-induced malaria. They are effective prophylactic agents, and are capable, for example, of protecting chickens against infection with malaria following inoculation with sporozoites derived from mosquitoes. The are capable of destroying fully developed exoerythrocytic forms of malaria parasites, as well as the erythrocytic forms, in chickens infected with *Plasmodium gallinaceum*. They function as curative antimalarial drugs, for example, in chickens, ducks and turkeys. They possess an extraordinary power for inhibiting the respiration of parasitized red blood cells and of other respiratory systems, even at extremely high dilution.

The same properties are exhibited by the corresponding hydroquinones, and by esters, for example, the acetates, propionates, caprylates and sulfates, of the hydroxyquinone compounds and of the corresponding hydroquinones.

In the following lists of typical compounds of the various groups described above, the column headed "Substituent" shows the group in the 2-position of the 3-hydroxy-1,4-naphthoquinone compound, "M. P." indicates the melting point of the compound in degrees C. and "Effective dose" is the amount of the compound in milligrams per kilogram body weight given three times per day required for 95% reduction of parasitemia as measured against *P. lophurae* in ducks.

TABLE I

| No. | Substituent | M. P. | Effective Dose |
|---|---|---|---|
| I–1 | —(CH$_2$)$_8$—CH=CH$_2$ | 70–71 | 13 |
| I–2 | —C$_8$H$_{17}$(n) | 88–89 | 23 |
| I–3 | —C$_9$H$_{19}$(n) | 79.5–80.5 | 8.7 |
| I–4 | —C$_{10}$H$_{21}$(n) | 90–91 | 19 |
| I–5 | —C$_{11}$H$_{23}$(n) | 79–80 | 23 |
| I–6 | —C$_{12}$H$_{25}$(n) | 93.8–94.6 | 25 |
| I–7 | —(CH$_2$)$_4$.CH(CH$_3$)$_2$ | 106–107 | 17 |
| I–8 | —(CH$_2$)$_5$.CH(CH$_3$)$_2$ | 111.8–112.6 | 13 |
| I–9 | —(CH$_2$)$_6$.CH(CH$_3$)$_2$ | 62–63 | 8.7 |
| I–10 | —(CH$_2$)$_7$.CH(CH$_3$)$_2$ | 77–78 | 9.8 |
| I–11 | —(CH$_2$)$_8$.CH(CH$_3$)$_2$ | 74.0–75.0 | 13.3 |
| I–12 | —CH(CH$_3$)(n—C$_6$H$_{13}$) | 71–72 | 40 |
| I–13 | —CH$_2$CH(CH$_3$)(n—C$_5$H$_{11}$) | 103–104 | 6.5 |
| I–14 | —CH(CH$_3$)(n—C$_7$H$_{15}$) | 69–69.5 | 34 |
| I–15 | —CH$_2$CH(CH$_3$)(n—C$_6$H$_{13}$) | 104–105 | 4.4 |
| I–16 | —CH$_2$CH(CH$_3$)(n—C$_7$H$_{15}$) | 97–98 | 7.5 |
| I–17 | —CH$_2$CH$_2$CH(CH$_3$)(n—C$_6$H$_{13}$) | 57–58 | 15 |
| I–18 | —CH$_2$CH(CH$_3$)(n—C$_9$H$_{19}$) | 90–90.5 | 23 |
| I–19 | —CH(CH$_3$)CH$_2$CH$_2$CH$_2$CH(CH$_3$)$_2$ | 79.4–80.5 | 5.7 |
| I–20 | —CH$_2$CH(CH$_3$)CH$_2$CH$_2$CH$_2$CH(CH$_3$)$_2$ | 108.5–109.5 | 10 |
| I–21 | —CH$_2$CH$_2$CH(CH$_3$)CH$_2$CH$_2$CH$_2$CH(CH$_3$)$_2$ | 73.5–74.5 | 13.8 |
| I–22 | —CH$_2$CH$_2$CH$_2$CH(CH$_3$)CH$_2$CH$_2$CH$_2$CH(CH$_3$)$_2$ | 73–74 | 22 |
| I–23 | —(CH$_2$)$_2$CH(CH$_3$)CH(CH$_3$).C$_2$H$_5$ | 68–70 | 27 |
| I–24 | —(CH$_2$)$_2$CH(CH$_3$)CH$_2$CH(CH$_3$)$_2$ | 68–69 | 10.5 |
| I–25 | —CH$_2$CH(CH$_3$)CH$_2$CH$_2$CH$_2$CH$_2$CH(CH$_3$)$_2$ | 97.5–98.5 | 7.7 |
| I–26 | —CH$_2$CH(C$_2$H$_5$)(n—C$_4$H$_9$) | 122–123 | 20 |
| I–27 | —CH$_2$CH(C$_2$H$_5$)CH$_2$CH(CH$_3$)$_2$ | 130.4–132.6 | 38 |
| I–28 | —CH$_2$CH(C$_2$H$_5$)CH$_2$CH(CH$_3$)(n—C$_3$H$_7$) | 126–127 | 34 |
| I–29 | —CH$_2$CH(C$_2$H$_5$)(n—C$_6$H$_{13}$) | 118–119 | 8.7 |
| I–30 | —CH$_2$CH(CH$_3$)CH$_2$CH$_2$CH(C$_2$H$_5$)(n—C$_4$H$_9$) | 73–74 | 5.2 |

TABLE II

| No. | Substituent | M. P. | Effective Dose |
|---|---|---|---|
| II–1 | —(CH$_2$)$_2$-cyclohexyl | 109–110 | 22 |
| II–2 | —(CH$_2$)$_3$-cyclohexyl | 132.6–133.3 | 19 |
| II–3 | —(CH$_2$)$_4$-cyclohexyl | 108–109 | 11.3 |
| II–4 | —(CH$_2$)$_5$-cyclohexyl | 104.5–105 | 10.6 |
| II–5 | —(CH$_2$)$_2$-cyclopentyl | 127.8–128.6 | 17.1 |
| II–6 | —CH$_2$-cyclooctyl | 109–110 | 23 |
| II–7 | —(CH$_2$)$_3$—  | 122–123 | 18.2 |
| II–8 | —(CH$_2$)$_3$—  | 110–115 | 23.6 |
| II–9 | —CH$_2$CH(CH$_3$)CH$_2$-cyclohexyl | 108–109 | 16 |
| II–10 | —CH$_2$CH$_2$CH(CH$_3$)-cyclohexyl | 91–92 | 39 |
| II–11 | —CH$_2$CH$_2$-β-decalyl-trans | 110–115 | 5.9 |
| II–12 | —CH$_2$CH$_2$-β-decalyl-cis | 117–120 | 5.5 |
| II–13 | —(CH$_2$)$_3$— 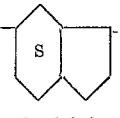 | 126–133 | 18 |
| II–14 | —(CH$_2$)$_3$-β-decalyl-cis | 116–125 | 4.3 |
| II–15 | —(CH$_2$)$_3$-β-decalyl-trans | 87–94 | 24.5 |
| II–16 | —(CH$_2$)$_4$-β-decalyl-trans | 113–120 | 14.5 |
| II–17 | —CH$_2$-4-perhydrodiphenyl-cis | 209–210 | 9.2 |
| II–18 | —CH$_2$-4-perhydrodiphenyl-trans | 129–131 | 6.7 |
| II–19 | —CH$_2$CH$_2$-4-perhydrodiphenyl-cis | 151–152 | |
| II–20 | —CH$_2$CH$_2$-4-perhydrodiphenyl-trans | 164.5–165 | 7.1 |
| II–21 | —(CH$_2$)$_3$-4-perhydrodiphenyl-cis | 111–112 | 14.6 |
| II–22 | —(CH$_2$)$_3$-4-perhydrodiphenyl-trans | 180–180.5 | 7.2 |
| II–23 | —CH$_2$— 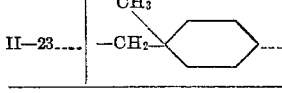 (with CH$_3$) | 113–114 | 63 |

TABLE III

| No. | Substituent | M. P. | Effective Dose |
|---|---|---|---|
| III–1 | -cyclopentyl | 92–94 | 100 |
| III–2 | -cyclohexyl | 136.5–137.5 | 7.5 |
| III–3 | -β-decalyl-cis | 151.5–163.0 | 5.0 |
| III–4 | -perhydrodiphenyl-cis | 166–166.5 | 9.0 |
| III–5 | -perhydrodiphenyl-trans | 195.5–196 | 0.78 |
| III–6 |  (α) | 136–137 | 7.4 |

TABLE IV

| No. | Substituent | M. P. | Effective Dose |
|---|---|---|---|
| IV—1 | —(CH₂)₃.C₆H₄.CH₃-p | 153.5–154.5 | 14 |
| IV—2 | —(CH₂)₄.C₆H₅ | 97–98 | 36.5 |
| IV—3 | —(CH₂)₅.C₆H₅ | 86–87 | 31.7 |
| IV—4 | —(CH₂)₃.C₆H₃(CH₃)₂-3,4 | 121–121.6 | 32.4 |
| IV—5 | —(CH₂)₃.C₆H₄.C₂H₅-p | 119.5–120 | 21 |
| IV—6 | —(CH₂)₃.C₆H₄.CH(CH₃)₂-p | 119.1–119.8 | 22 |
| IV—7 | —(CH₂)₃.β-hydrindyl | 130.4–132.2 | 35 |
| IV—8 | —(CH₂)₃.C₆H₄.C(CH₃)₃-p | 112–113 | 38 |
| IV—9 | —(CH₂)₃.β-tetralyl | 122.8–124 | 38 |
| IV—10 | —(CH₂)₃.β-naphthyl | 159.5–161 | 35 |
| IV—11 | —(CH₂)₄.β-tetralyl | 100.5–101.5 | 30.8 |
| IV—12 | —(CH₂)₉.C₆H₅ | 65.6–66.6 | 13.9 |
| IV—13 | —(CH₂)₃.C₆H₄OC₆H₅ | 110.6–111.6 | 15.7 |
| IV—14 | —CH₂—⌬—⌬ (α) | 170–172 | 9.0 |

TABLE V

| No. | Substituent | M. P. | Effective Dose |
|---|---|---|---|
| V—1 | —CH₂CH₂.C₆H₄Cl-p | 153.5–154.5 | 18.1 |
| V—2 | —(CH₂)₃.C₆H₄Cl-p | 152.2–153 | 19 |
| V—3 | —(CH₂)₃.C₆H₄Br-p | 162.5–163.5 | 21 |
| V—4 | —(CH₂)₃.C₆H₃Cl(4)CH₃(3) | 134.8–135.2 | 32.1 |

The substituted hydroxynaphthoquinones of the invention may be made by the acyl peroxide method described in application Ser. No. 500,288, filed August 27, 1943, by Louis F. Fieser, now Patent No. 2,398,418, although occasionally the use of other methods of preparation may be desirable because of the better yields afforded or because of the greater accessibility of the necessary starting materials.

In general, the acyl peroxide method consists in the dropwise addition of an ethereal or hydrocarbon solution of a diacyl peroxide $(R.CO)_2O_2$, where R represents the organic radical to be introduced into the quinonoid nucleus, to a solution of the hydroxynaphthoquinone in acetic acid at a temperature of about 90° C. The ether distils from the reaction mixture and there results a solution of the substituted quinone, unchanged hydroxynaphthoquinone, the acid R.COOH, and hydrocarbons of the types RH and R.R. The desired substituted quinone often separates on cooling or after concentration of the acetic acid. In some instances, an ethereal extract of the reaction mixture is advantageously extracted with sodium bicarbonate to remove unchanged hydroxynaphthoquinone, and then with alkali to separate acidic from non-acidic products. It is sometimes expedient to treat the residual acidic fraction with methanol and hydrogen chloride to convert any acid of the type RCOOH into a neutral ester. The substituted product may also be extracted from the unsubstituted material with ligroin.

The following are illustrative examples of typical methods of preparing specific compounds of the invention.

*Example 1.—2-n-nonyl-3-hydroxy-1,4-naphthoquinone (No. I–3)*

Decanoyl peroxide prepared from capryl chloride by interaction with hydrogen peroxide and sodium peroxide at —10° C. in the presence of ether crystallizes from the chilled ethereal solution in 65% yield. A solution of 9.5 gm. of lawsone in 160 cc. of acetic acid is treated with an equivalent amount of the peroxide in ether solution at steam bath temperature, and, after the evolution of carbon dioxide has ceased, the solvent is removed in a vacuum. The residual oil is extracted with hot ligroin from a residue of the hydroxynaphthoquinone and when the solution is cooled in dry ice deposits yellow crystals which upon repeated crystallization melt at 79.5–80.5° C. The yield is 69% based on unrecovered lawsone.

*Example 2*

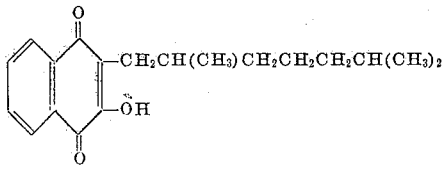

(No. I–20)

2-β-methylisooctyl-3-hydroxy-1,4-naphthoquinone

This compound may be made by the alkylation of lawsone with the corresponding acyl peroxide as in the preceding example in 54% yield. On recrystallization from ligroin and methanol it melts at 108.5–109.5° C.

*Example 3*

The same compound may be made by Hooker's method (Hooker, J. Am. Chem. Soc. 58, 1168, 1936) wherein the next higher homologue of the desired compound is oxidized. A solution of 16 gm. of compound No. I–21 (Table I) in 400 cc. of acetone is added to 1160 cc. of 0.5% sodium hydroxide and the solution is treated at 0° C. with a cooled (0° C.) solution of 11.2 gm. of potassium permanganate in 1160 cc. of 10% sodium hydroxide. After three hours at 0° C. and twelve hours at 25° C., the solution is filtered and acidified. Yellow crystals separate on cooling in 37% yield.

*Example 4*

Oxidation of the product obtained in Examples 2 and 3 by the method of Example 3 gives the next lower homologue (compound No. I–19, Table I).

*Example 5.—2-(γ-cyclohexyl)propyl-3-hydroxy-1,4-naphthoquinone (No. II–2)*

A solution of 11.2 gm. of the peroxide of γ-cyclohexylbutyric acid in 150 cc. of petroleum ether is added to a suspension of 5.5 gm. of lawsone in 80 cc. of acetic acid. The mixture is warmed to remove petroleum ether and then heated for one hour at 90° C. and one-half hour at 95° C. The solvent is evaporated in vacuum and the residual brown oil is extracted with ligroin. The extracted material on recrystallization from methanol melts at 132.6–133.3° C.; yield 68.3%.

*Example 6.—2-(γ-cis-β-decalyl)propyl-3-hydroxy-1,4-naphthohydroquinone (No. II–14)*

Lawsone (17.4 g.) is dissolved in acetic acid in a round-bottomed flask on the steam bath. A long-stemmed separatory funnel is set up above the flask with the end of the stem near the bottom of the acetic acid solution. The ether solution of 0.1 mole of the peroxide of γ-2-decalylbutyric acid is then added through the separatory funnel at a rate that maintains the temperature of the reaction solution above 90° (time of addition: ninety minutes). The alkylation is completed by heating the solution on the steam bath for one hour longer. The acetic acid is then concentrated in vacuum on the steam bath. The brown gum that remains in the flask is extracted with hot ether several times, and the ether extracts are filtered with suction from the slightly soluble starting material. The combined ethereal extracts are shaken with equal portions of 3% sodium bicarbonate solution until the aqueous layer is only faintly pink. The extraction of the ether layer is then continued with 10% sodium carbonate until the deep red sodium salt of the quinone precipitates as an oil at the interface of the layers.

The red bicarbonate extracts contain the sodium salt of lawsone. Lawsone is recovered in a fair state of purity by acidification of the extracts with hydrochloric acid. The sodium carbonate extracts contain the salt of the starting acid and a little of the quinone product. These extracts on acidification with hydrochloric acid give an oil that crystallizes on standing to a filterable product.

After the carbonate extraction, cold dilute hydrochloric acid is added to the ether layer and the oily sodium salt in the separatory funnel. After shaking carefully for a few minutes, the red salt should go into the ether layer as the free quinone. The yellow ether layer is washed with water, dried, shaken with a little norit and filtered by gravity; 150 cc. of ligroin (70–90°) is added to the ether solution which is then concentrated on the steam bath until all of the ether is removed. The ligroin solution of the quinone is allowed to stand in the cold overnight and filtered. The product is washed with a little cold petroleum ether and dried in air. The quinone is dissolved in the necessary amount of hot methanol (400–500 cc.) containing a few drops of concentrated hydrochloric acid. The alcoholic solution is filtered and then boiled down to a volume about 150–200 cc. After the solution has stood for several hours in an ice bath, the quinone is collected, washed with cold methanol and dried in vacuo at 60–70° for a few hours. The reaction affords the alkylated quinone in 50–45% yield (10–16 grams). The material is a stereoisomeric mixture melting at 116–125°.

The alicyclic substitution products of 3-hydroxy-1,4-naphthoquinone of Table III may be made by interaction of the peroxides of the corresponding carboxylic acids with lawsone according to the procedure of Example 1, but substantially better yields are obtainable by oxidation, by the method of Example 3, of the alicyclic-methyl-substitution products (readily obtainable from the peroxides of the alicyclic-acetic acids by the method of Example 1).

The cyclohexyl substitution product (No. III–2) may also be made by the action of cyclohexene on 1,2,4-trihydroxynaphthalene in the presence of liquid anhydrous hydrogen fluoride and subsequent air oxidation in alkaline solution.

The aralkyl substitution products of Tables IV and V may all be made by the acid peroxide alkylation procedure of Example 1. They may also be made by the oxidation method of Example 3.

Another useful method for producing the compounds of the invention is the ring closure method involving the reactions

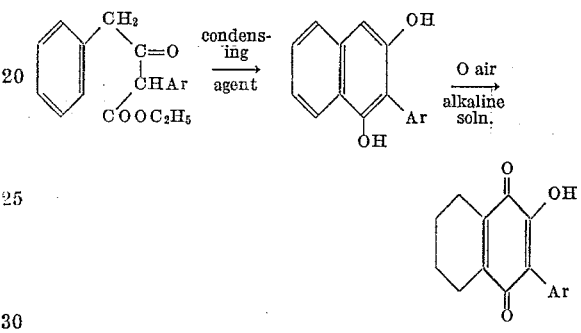

where Ar=aryl or substituted aryl group. By alkylating with RX, the β-keto ester,

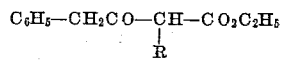

to give

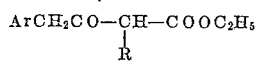

(where R=alkyl or aryl) it is possible to use this same process to prepare compounds with aliphatic (R) groups in place of Ar.

A general description of the details of the process is given below:

RING CLOSURE OF β-KETOESTERS OF TYPE $$ArCH_2CO-CH(R)-COOC_2H_5$$

(R=aryl or alkyl)

*Procedure A.—Ether—$H_2SO_4$*

One tenth of a mole of the β-keto-ester is dissolved in 70 cc. dry ether and to this cooled solution is added dropwise with stirring, 140 cc. cold concentrated sulfuric acid, keeping temperature below 10° C. After addition is complete, the mixture is allowed to stand at room temperature for 4 to 20 hours and poured into ice. The ether layer is washed with saturated sodium bicarbonate solution and water and then dried. The residue remaining after evaporation of the ether extract can, if a solid, be crystallized from appropriate solvents (such as chloroform, carbon tetrachloride and cyclohexane) to obtain the pure naphthoresorcinol of type,

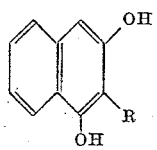

If the product remains as an oil it can be taken up in excess aqueous or aqueous-alcoholic alkali (potassium hydroxide or sodium hydroxide) and aerated with a stream of air for 16 to 24 hours. The resulting deeply colored solution or suspension is then acidified with excess acetic acid. The yellow or red quinone thus obtained is taken up in ether, washed with sodium bicarbonate solution, and dried. Evaporation of the ether leaves the residue which can be crystallized from appropriate solvents such as methyl alcohol, ethyl alcohol, and petroleum hydrocarbons to give the pure hydroxyquinone shown above.

*Procedure B.—Sulfuric acid*

Five grams of the β-keto-ester is dissolved in 15 cc. concentrated sulfuric acid keeping the temperature below 10° C. The mixture is then allowed to stand at room temperature for 4 to 20 hours. It is then poured into ice and treated further exactly as indicated in Procedure A.

*Procedure C.—Anhydrous HF*

Five grams of the β-keto-ester is added to 50 gm. of anhydrous hydrofluoric acid contained in a copper vessel cooled in an ice-bath. The mixture is allowed to stand at room temperature for 16 to 20 hours with occasional stirring by means of a copper wire. The hydrogen fluoride that has not evaporated is poured into ice and treated exactly as indicated in Procedure A.

3-acyl derivatives of the compounds described above may be made by dissolving the quinone in the appropriate acyl anhydride and warming on a steam bath. At the end of the reaction the reaction mixture is poured into ice water and the product is extracted with ether. The ether solution is separated and dried over anhydrous magnesium sulfate and the product purified in the usual manner by recrystallization from an appropriate solvent.

To form the triacyl derivatives of the corresponding hydroquinones, the quinone is first reduced with zinc in dilute acid to the hydroquinone, which is then treated with acyl anhydride in the manner described above.

The following are typical acyl derivatives:

2-γ-cyclohexylpropyl - 3 - hydroxy-1,4-naphthoquinone acetate, M. P. 72.5–73.5
2-γ-cyclohexylpropyl - 3-hydroxy - 1,4 -naphthoquinone propionate, M. P. 49–50
2-γ-cyclohexylpropyl -1,3,4-trihydroxy-naphthalene triacetate, M. P. 93.5–94
2-β-methyloctyl-3-hydroxy - 1,4-naphthoquinone acetate, M. P. 40–42
2-β-methyloctyl-3-hydroxy - 1,4-naphthoquinone propionate, B. P. 190–193 at 0.5 mm.
2-cyclohexyl - 3 - hydroxy - 1,4 - naphthoquinone acetate
2-α-methylisoheptyl-3-hydroxy -1,4-naphthoquinone acetate
2-β-methylisooctyl - 3-hydroxy- 1,4-naphthoquinone acetate
2-γ-methylisononyl-3-hydroxy - 1,4-naphthoquinone acetate, Yellow Oil Without further elaboration the foregoing will so fully explain our invention that others may readily adapt the same for use under various conditions of service. As at present advised with respect to the apparent scope of our invention, we desire to claim the subject matter of the following claims, and equivalents thereof.

We claim:
1. Physiologically active derivatives of 3-hydroxy-1,4-naphthoquinone of the general formula

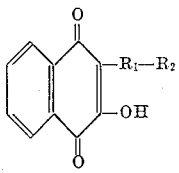

wherein $R_1$ represents a saturated aliphatic hydrocarbon chain containing at least two carbon atoms and $R_2$ represents a cycloaliphatic ring system containing at least one and not more than two alicyclic rings, $R_1$ and $R_2$ together having from 8 to 15 carbon atoms.

2. As a new chemical compound, 3-hydroxy-1,4-naphthoquinone substituted in 2 position with a cyclohexyl propyl group.

3. As a new chemical compound, 3-hydroxy-1,4-naphthoquinone substituted in 2 position with a cyclohexyl butyl group.

4. As a new chemical compound, 3-hydroxy-1,4-naphthoquinone substituted in 2 position with the cis isomer of a β-decalyl ethyl group.

5. As a new chemical compound, 3-hydroxy-1,4-naphthoquinone substituted in 2 position with the trans isomer of a β-decalyl ethyl group.

6. As a new chemical compound, 3-hydroxy-1,4-naphthoquinone substituted in 2 position with the cis isomer of a β-decalyl propyl group.

7. Method of producing 2-hydroxy-1,4-naphthoquinones substituted in 3 position with an organic radical substituent R, which comprises:
(1) alkylating the β-keto ester

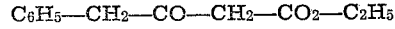

with a compound RX to form

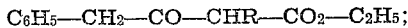

(2) closing the second ring with an acid condensing agent to form the 2,4-hydroxy-3-R naphthoresorcinol; and (3) oxidizing the naphthoresorcinol in alkaline solution to change it to the 2-hydroxy-3-R-1,4-naphthoquinone.

8. New chemical compounds having anti-malarial activity consisting of 3-hydroxy-1,4-naphthoquinones substituted in the 2 position by a cyclohexylalkyl group having from 2 to 5 carbon atoms in the alkyl chain.

9. New chemical compounds having anti-malarial activity consisting of 3-hydroxy-1,4-naphthoquinones substituted in the 2 position by a β-decalylalkyl group having from 2 to 4 carbon atoms in the alkyl chain.

LOUIS F. FIESER.
MARLIN T. LEFFLER.

REFERENCES CITED

The following references are of record in the file of this patent:

UNITED STATES PATENTS

| Number | Name | Date |
| --- | --- | --- |
| 2,398,418 | Fieser | Apr. 16, 1946 |

OTHER REFERENCES

Hooker: Jour. Am. Chem. Soc., vol. 58, pp. 1163–1167 (1936).
Hooker: Jour. Am. Chem. Soc., vol. 58, pp. 1174–1179 (1936).
Gates: Jour. Am. Chem. Soc., vol. 64, pp. 1979–1980 (1942).
Wiselogle: A Survey of Antimalarials (1946), pp. 114, 117, 121, 123, 126, 128–130 and 134.